(12) United States Patent
Sibnath et al.

(10) Patent No.: US 8,189,856 B2
(45) Date of Patent: May 29, 2012

(54) SYSTEM AND APPARATUS FOR EVALUATING THE RELIABILITY OF A WATERMARKING TECHNIQUE FOR A VIDEO SEQUENCE

(75) Inventors: Chattopadhyay Tanushyam Sibnath, Kolkata (IN); Pal Arpan Dipak Kumar, Kolkata (IN)

(73) Assignee: Tata Consultancy Services Ltd., Mumbai (IN)

( * ) Notice: Subject to any disclaimer, the term of this patent is extended or adjusted under 35 U.S.C. 154(b) by 1120 days.

(21) Appl. No.: 12/012,669

(22) Filed: Feb. 5, 2008

(65) Prior Publication Data
US 2008/0260203 A1   Oct. 23, 2008

(30) Foreign Application Priority Data
Feb. 5, 2007   (IN) .......................... 207/MUM/2007

(51) Int. Cl.
*G06K 9/00*   (2006.01)
(52) U.S. Cl. ........ 382/100; 380/200; 380/201; 380/202; 380/203; 380/204; 358/426.01; 358/426.02; 358/426.03; 358/426.04; 358/426.05; 375/240.05; 375/240.01; 375/240.02; 375/240.03; 375/240.04; 348/384.1; 348/440.1

(58) Field of Classification Search .................. 382/100, 382/232–253; 380/200–242; 358/426.01–426.16; 354/55; 348/384.1–440.1; 375/122, 240.01–240.29
See application file for complete search history.

(56) References Cited

U.S. PATENT DOCUMENTS

| | | | | |
|---|---|---|---|---|
| 2003/0198363 A1* | 10/2003 | Liao et al. | ...................... | 382/100 |
| 2004/0086122 A1* | 5/2004 | Watson | ...................... | 380/261 |
| 2006/0257000 A1* | 11/2006 | Boyce et al. | ...................... | 382/100 |

\* cited by examiner

*Primary Examiner* — Atiba O Fitzpatrick
(74) *Attorney, Agent, or Firm* — Robert Plotkin, P.C.

(57) ABSTRACT

A system and apparatus for evaluating the reliability of a watermarking technique for a video sequence, said system and apparatus comprising:
 a) a calibrating means adapted to calibrate said system and apparatus using a test original video sequence and a test attacked video sequence in compliance with predetermined degrees of quality;
 b) an attacking means adapted to attack embedded watermark in said video sequence, said attack selected from a group of attacks; and
 c) an evaluating means including a comparator means for comparing the test original video sequence with test attacked video sequence and the watermark in the test original video sequence with the watermark in the test attacked video sequence to evaluate the reliability of a watermarking technique to give a reliability score.

13 Claims, 7 Drawing Sheets

| Acronym | Full name |
|---|---|
| Rot | Rotational Attack |
| Avg | Averaging Attack |
| Circ Avg | Circular Averaging Attack |
| Freq Flt | Frequency Filtering Attack |
| Gam Corr | Gamma Correction Attack |
| Gaussian | Gaussian Attack |
| Hist eq | Histogram Equalization Attack |
| Laplacian | Laplacian Attack |
| Nonlin Flt | Non Linear Filtering Attack |
| Resize | Resize Attack |

| Acronym | Full name |
|---|---|
| Rot | Rotational Attack |
| Avg | Averaging Attack |
| Circ Avg | Circular Averaging Attack |
| Freq Filt | Frequency Filtering Attack |
| Gam Corr | Gamma Correction Attack |
| Gaussian | Gaussian Attack |
| Hist eq | Histogram Equalization Attack |
| Laplacian | Laplacian Attack |
| Nonlin Filt | Non Linear Filtering Attack |
| Resize | Resize Attack |

FIGURE - 1

| Video Quality (Cqual) | Error in retrieved Image (Cimg) | Error in retrieved Text (C$_{txt}$) | Overall Measure of Goodness |
|---|---|---|---|
| Any | Excellent | Excellent | Excellent |
| Any | Excellent | Good | Good |
| Any | Good | Excellent | Good |
| Any | Good | Good | Good |
| Excellent or Good | Medium | Medium | Medium |
| Excellent or Good | Bad or Poor | Medium | Bad |
| Excellent or Good | Medium | Bad or Poor | Bad |
| Excellent or Good | Bad or Poor | Bad or Poor | Poor |
| Medium, Bad or Poor | Medium, Bad or Poor | Medium, Bad or Poor | Attack degrades video quality beyond acceptable level – hence the attack itself is not suitable |

FIGURE - 2

| Attack | AAD | GSSNR | HS | IF | LMSE | MSE | NMSE | PSNR | SC | SNR |
|---|---|---|---|---|---|---|---|---|---|---|
| Avg | 0.000 | 581629.059 | 0.000 | 1.000 | 0.064 | 0.000 | 0.000 | 92.116 | 1.000 | 90.000 |
| Circ Avg | 3.640 | 5.747 | 3103.596 | 0.996 | 0.691 | 68.730 | 0.004 | 29.820 | 0.981 | 24.822 |
| Freq Filt | 11.899 | 0.214 | 8875.663 | 0.971 | 15.526 | 487.640 | 0.029 | 19.089 | 0.932 | 15.883 |
| Gam Corr | 31.798 | 6.603 | 20162.921 | 0.943 | 0.268 | 1640.112 | 0.057 | 16.145 | 1.527 | 12.486 |
| Gaussian | 1.899 | 21.288 | 3080.539 | 0.999 | 0.214 | 20.719 | 0.001 | 35.169 | 0.987 | 29.982 |
| Hist eq | 22.562 | 4.459 | 26580.944 | 0.950 | 0.299 | 1006.910 | 0.050 | 18.312 | 1.082 | 13.126 |
| Laplacian | 14.764 | 2.854 | 7659.618 | 0.960 | 0.447 | 796.360 | 0.040 | 19.637 | 1.077 | 14.423 |
| Nonlin Filt | 9.753 | 1.449 | 5335.258 | 0.967 | 2.349 | 563.090 | 0.033 | 19.780 | 0.943 | 15.084 |
| Resize | 0.000 | 581629.059 | 0.000 | 1.000 | 0.064 | 0.000 | 0.000 | 92.116 | 1.000 | 90.000 |
| Rot | 3.337 | 5.887 | 1453.551 | 0.973 | 0.509 | 477.011 | 0.027 | 21.638 | 0.975 | 16.039 |

FIGURE - 3

| Attack | VALUE | Cqual |
|---|---|---|
| Avg | 100.000 | Excellent |
| Circ Avg | 52.000 | Poor |
| Freq Filt | 25.000 | Poor |
| Gam Corr | 27.000 | Bad |
| Gaussian | 71.000 | Poor |
| Hist eq | 27.000 | Poor |
| Laplacian | 28.000 | Poor |
| Nonlin Filt | 25.000 | Poor |
| Resize | 100.000 | Excellent |
| Rot | 37.000 | Poor |

FIGURE - 4

| Attack | $b_e$ | $c_e$ | $d_e$ | e | $C_{img}$ |
|---|---|---|---|---|---|
| Avg | 0.000 | 0.000 | 0.000 | 0.000 | Excellent |
| Circ Avg | 5.469 | 9.896 | 3.448 | 6.271 | Medium |
| Freq Filt | 5.469 | 10.938 | 55.172 | 23.860 | Poor |
| Gam Corr | 0.781 | 1.563 | 3.448 | 1.931 | Good |
| Gaussian | 4.948 | 9.896 | 24.138 | 12.994 | Bad |
| Hist eq | 1.563 | 1.563 | 3.448 | 2.191 | Good |
| Laplacian | 1.823 | 2.083 | 0.000 | 1.302 | Good |
| Nonlin Filt | 5.729 | 10.417 | 13.793 | 9.980 | Medium |
| Resize | 0.000 | 0.000 | 0.000 | 0.000 | Excellent |
| Rot | 0.781 | 0.521 | 0.000 | 0.434 | Excellent |

FIGURE - 5

| Attack | l | h | $t_e$ | $C_{txt}$ |
|---|---|---|---|---|
| Avg | 0 | 0 | 0.000 | Excellent |
| Circ Avg | 6 | 1 | 3.5 | Bad |
| Freq Filt | 6 | 1 | 3.5 | Bad |
| Gam Corr | 0 | 1 | .5 | Good |
| Gaussian | 5 | 1 | 3 | Bad |
| Hist eq | 6 | 7 | 6.5 | Poor |
| Laplacian | 4 | 5 | 4.5 | Bad |
| Nonlin Filt | 6 | 1 | 3.5 | Bad |
| Resize | 0 | 0 | 0.000 | Excellent |
| Rot | 0 | 0 | 0.000 | Excellent |

FIGURE - 6

| Attack | Video Quality after attack | Retrieved Image quality | Retrived text quality | Overall measure of goodness |
|---|---|---|---|---|
| Averaging Attack | Excellent | Excellent | Excellent | Excellent |
| Circular Averaging Attack | Poor | Medium | Bad | Attack degrades video quality beyond acceptable level – hence the attack itself is not suitable |
| Freq Filtering Attack | Poor | Poor | Bad | Attack degrades video quality beyond acceptable level – hence the attack itself is not suitable |
| Gamma Correction Attack | Poor | Good | Good | Attack degrades video quality beyond acceptable level – hence the attack itself is not suitable |
| Gaussian Attack | Bad | Bad | Bad | Attack degrades video quality beyond acceptable level – hence the attack itself is not suitable |
| Histogram Equalization Attack | Poor | Good | Poor | Attack degrades video quality beyond acceptable level – hence the attack itself is not suitable |
| Laplacian Enhancement Attack | Poor | Good | Bad | Attack degrades video quality beyond acceptable level – hence the attack itself is not suitable |
| Nonlinear Filtering Attack | Poor | Medium | Bad | Attack degrades video quality beyond acceptable level – hence the attack itself is not suitable |
| Resize Attack | Excellent | Excellent | Excellent | Excellent |
| Rotate Attack | Poor | Excellent | Excellent | Excellant |

FIGURE - 7

SYSTEM AND APPARATUS FOR EVALUATING THE RELIABILITY OF A WATERMARKING TECHNIQUE FOR A VIDEO SEQUENCE

FIELD OF THE INVENTION

This invention relates to watermarking in a video coding decoding.

In particular, this invention envisages a novel way of evaluating any scheme of watermarking of video sequence based on block based coding.

In particular, this invention relates to a method of evaluating watermark against different image/video/text comparison parameters.

Still particularly, this invention relates to H.264 video CODECs (Encoder-Decoders) and in particular to a method for evaluation of compressed domain watermarking for digital rights in H.264 video.

BACKGROUND OF THE INVENTION

In the current trend of Internet based multimedia applications, digital rights management and security is extremely important for ownership tracking, author's authentication proving and copyright management. A lot of watermarking techniques have come into market and at the same time lots of attacks have been developed to destroy any hidden information in terms of watermarking embedded into the video stream. So it is imperative to have a system that can report the goodness of any watermarking scheme in terms of its robustness against attacks.

Proliferation of digital storage and Internet based multimedia applications leads to threaten video content industry due to illegal and unauthorized copy of multimedia data. This increases the need for devising copyright protection and authentication measures. As a consequence of these requirements, well-defined water marking attack evaluation technique is the need of the day.

Any watermarking scheme can be evaluated by its performance measured in terms of its complexity and robustness against attacks. An attack to watermarking system can be defined as the technique to remove or change the hidden data in the video bitstream. Hence, in any watermarking evaluation technique, it is essential to concentrate on attacks on watermarking scheme by simulating the process of any end user trying to remove or destroy the hidden information embedded into the video stream. Moreover, the evaluation method should also provide a measure of goodness of watermarking scheme in terms of robustness of the scheme and resultant video quality after the attack.

SUMMARY OF THE INVENTION

In accordance with this invention, a novel method and apparatus is presented to measure and evaluate an attack/watermarking technique by comparing the attacked video with original watermarked video stream and comparing the original video with the watermarked video.

The watermark as referred herein, relates to the company logo (image converted to in binary format), and the timestamp and the IP address (text converted to binary format) typically used as the embedding message. Moreover the entire stream is hashed to produce a unique number and that is again embedded as the watermark in some other frame to check the integrity. A video sequence as referred herein comprises IDR (Independent Decoder Refresh) frames and P (Predictive) frames. IDR frames are used to synchronise the video data during transmission of video data. For decoding all P frames (frames predicted using temporal redundancy), IDR frames are required. Any tampering in IDR frames can cause a significant loss in video quality. Hence, IDR frames are selected for inserting watermark.

Usually any binary image or any text message is used as embedding information during watermarking. In the method in accordance with this invention, inserted binary image and/or text message is compared with retrieved and/or text message using multifactorial methods. The obtained score is compared with the results obtained by Mean Opinion Score (MOS), which is purely based on Human Vision Psychology (HVS), and finally assigning a fuzzy membership value to each class of watermark.

In the system in accordance with this invention, a measure is devised that can be used to evaluate the attack as well as the watermarking scheme. The watermarking scheme and the attacking methods are evaluated in three ways.

First, a comparison is done of the attacked stream with watermarked stream. A plurality of parameters are used to measure the goodness of video quality after which an unified decision is made using multifactorial approach.

Users, typically Twenty users (15 men and 5 women), are asked to rate the attacked video quality as per their perception into 4 classes, to judge the video quality of the attacked streams.

Secondly, the retrieved and embedded binary images and texts are compared using statistical parameters.

Finally, the goodness of the method in terms of observations are observed.

Typically, a system and apparatus in accordance with this invention for evaluating the reliability of a watermarking technique for a video sequence comprises:
  a) a calibrating means adapted to calibrate said system and apparatus using a test original video sequence and a test attacked video sequence in compliance with predetermined degrees of quality;
  b) an attacking means adapted to attack embedded watermark in said video sequence, said attack selected from a group of attacks; and
  c) an evaluating means including a comparator means for comparing the test original video sequence with test attacked video sequence and the watermark in the test original video sequence with the watermark in the test attacked video sequence to evaluate the reliability of a watermarking technique to give a reliability score.

Typically, said calibrating means comprises:
  a video receiving means adapted to receive a video sequence comprising IDR frames and P frames having macroblocks and sub-macroblocks;
  a frame reading means adapted to read said video sequence frame by frame; and
  a watermark detector adapted to retrieve embedded watermark in said frame of said video sequence.

Typically, said video receiving means is adapted to receive said test original video sequence and said test attacked video sequence.

Typically, said calibrating means is adapted to:
  compare two identical frames and calibrate said apparatus to treat such identical frames as best case data sets;
  compare two completely different frames and calibrate said apparatus to treat such completely different frames as worst case data sets; and
  compare an original and a compressed-decompressed frame and calibrate said apparatus to treat such compressed-decompressed frames as average case data sets.

Typically, said attacking means selects at least one attacking technique from a group of attacking techniques consists of rotational attacking technique, averaging attacking technique, circular averaging technique, frequency filtering attacking technique, gamma correction attacking technique, gausian attacking technique, histogram equalization attacking technique, laplacian attacking technique, non-linear filtering attacking technique, and resize attacking technique.

Typically, said evaluation means comprises:
- a first computation means adapted to obtain pixel based metrics for said test attacked video sequence, said pixel based metrics including values computed by at least one function selected from a group of functions for comparing two still frames of said test attacked video sequence;
- a deviation checking means adapted to obtain deviation of binary constituents of images and text embedded as said watermark in said test attacked video sequence;
- a register adapted to receive and store human-based scores; and
- a second computation means adapted to compute a qualitative result of degree of quality of test attacked video sequence based on results from said first computation means, said deviation checking means and said register.

The invention includes a method of using different pixel based metrics (typically, 10 parameters) for finding the video distortion. This method is carried out by the first computation means.

Typically, said first computation means selects at least one computation function selected from a group of computation functions consisting of:

1. Average Absolute Difference (AAD)

$$AAD = \frac{1}{MN} \sum_{m,n} |I_{m,n} - \bar{I}_{m,n}|;$$

2. Mean Square Error (MSE)

$$MSE = \frac{1}{MN} \sum_{m,n} (I_{m,n} - \bar{I}_{m,n})^2;$$

3. Normalized Mean Square Error (NMSE)

$$NMSE = \sum_{m,n} (I_{m,n} - \bar{I}_{m,n})^2 \bigg/ \sum_{m,n} I_{m,n}^2;$$

4. Laplacian Mean Square Error (LMSE)

$$LMSE = \sum_{m,n} (\nabla^2 I_{m,n} - \nabla^2 \bar{I}_{m,n})^2 \bigg/ \sum_{m,n} (\nabla^2 I_{m,n})^2;$$

5. Signal to Noise Ratio (SNR)

$$SNR = \sum_{m,n} I_{m,n}^2 \bigg/ \sum_{m,n} (I_{m,n} - \bar{I}_{m,n})^2;$$

6. Peak Signal to Noise Ratio (PSNR)

$$PSNR = MN \cdot \max_{m,n} I_{m,n}^2 \bigg/ \sum_{m,n} (I_{m,n} - \bar{I}_{m,n})^2;$$

7. Image Fidelity (IF)

$$IF = 1 - \sum_{m,n} (I_{m,n} - \bar{I}_{m,n})^2 \bigg/ \sum_{m,n} I_{m,n}^2;$$

8. Structural Content (SC)

$$SC = \sum_{m,n} I_{m,n}^2 \bigg/ \sum_{m,n} \bar{I}_{m,n}^2;$$

9. Global Sigma Signal to Noise Ratio (GSSNR)

$$GSSNR = \sum_{m,n} \sigma_b^2 \bigg/ \sum_b (\sigma_b - \bar{\sigma}_b)^2$$

Where $\sigma_b = \sqrt{\frac{1}{P} \sum_{block\ b} I_{m,n}^2 - \left(\frac{1}{P} \sum_{block\ b} I_{m,n}\right)^2}$; and 10. Histogram Similarity (HS)

$$HS = \sum_{c=0}^{255} |f_I(c) - \bar{f}_I(c)|$$

where $f_I(c)$ is the relative frequency of level c in a 255 levels image

The retrieved watermark image/message can be judged to be good or bad by checking some of its features, too.

Typically, the method involves using different feature-based scores (3 for image and 2 for text) for checking the retrieved text or image quality.

Typically, said deviation checking means computes centroid deviation for black and white pixels of a watermarked image of an attacked video sequence and checks it against original video sequence.

First Check for binary images:

Centroid deviation of 1s and 0s—In most of the cases binary images are used as watermark image. Any binary image consists of only two image values: 0 and 1. Now the Centroid of 0s and 1s means that the center of gravity for each of these pixel values.

The checking algorithm is as follows:

Compute the Centroid of 1s and 0s for the image that has been used as watermark

Compute the same for retrieved image

Now find the deviation for black pixels and white pixels.

For example if we compute the average of the x and y coordinate of each pixels having 0 values, the average positional coordinate will represent the Centroid of pixel value 0 in this particular binary image. Same thing can be done for pixels having value 1.

Now deviation of Centroid is computed by finding the shift in Centroid coordinates in two binary images. Say, for example, the Centroid of 0 valued pixels in image 1 and image 2 be represented as image_$1_0$ and image_$2_0$ respectively. Now the Centroid deviation can be computed as: image_$1_0$-image_$2_0$ Typically, said deviation checking means computes run length of black and white pixels of a watermarked image of an attacked video sequence and checks it against original video sequence.

Second Check for binary images:

Run length feature—If image of some text is inserted as the watermark, Runlength of black/white pixels is a feature by which it can be recognized. As we have already explained that a binary image consists of only two pixel values: 0 and 1 representing white and black respectively. Now any image may contain some consecutive pixels in a row having the same color. This consecutive pixels having similar color is known as run of this particular color. As this color can be white or black, accordingly run length feature for each of these colors can be obtained.

The checking algorithm is as follows:

Compute the Runlength of white/black (0/1) for each row of original image

Compute the Runlength of white/black (0/1) for each row of retrieved image

Typically, said deviation checking means computes deviation from 0 to 1 and 1 to 0 for each row of a watermarked image of an attacked video sequence and checks it against original video sequence.

Typically, said deviation checking means computes deviation from 0 to 1 and 1 to 0 for each column of a watermarked image of an attacked video sequence and checks it against original video sequence.

Third Check for binary images:

Crossing count feature—If image of some text is inserted as the watermark, number of 0 to 1 transition or 1 to 0 transition is an interesting feature. As we have already explained that a binary image consists of only two pixel values: 0 and 1 representing white and black respectively. Now any image may contain some consecutive pixels in a row having the same color or there may be a transition of color (from black to white or white to black). Crossing count feature computes the number of such transitions.

The checking algorithm can be:

Compute the 0 to 1 and 1 to 0 transitions for each row of original image

Compute the 0 to 1 and 1 to 0 transitions for each column of original image

Typically, said deviation checking means computes hamming distance between watermarked text of two frames of an attacked video sequence and checks it against original video sequence.

First Check for text message:

Hamming distance between texts—In information theory, the Hamming distance between two strings of equal length is the number of positions for which the corresponding symbols are different. It measures the number of edit required to change one into the other, or the number of errors that transformed one string into the other.

Typically, said deviation checking means computes Levenshtein distance between watermarked text of two frames of an attacked video sequence and checks it against original video sequence.

Second Check for text message:

Levenshtein distance—In information theory and computer science, the Levenshtein distance or edit distance between two strings is given by the minimum number of operations needed to transform one string into the other, where an operation is an insertion, deletion, or substitution of a single character. It is named after Vladimir Levenshtein, who considered this distance in 1965. It is useful in applications that need to determine how similar two strings are, such as spell checkers. It can be considered a generalization of the Hamming distance, which is used for strings of the same length and only considers substitution edits. There are also further generalizations of the Levenshtein distance that consider, for example, exchanging two characters as an operation, like in the Damerau-Levenshtein distance algorithm.

Typically, said register is adapted to store inputted video sequence degree of evaluation human-based scores (as defined herein) wherein, said original video sequence and said attacked video sequence are visually compared by a plurality of persons and judged on a common scale to provide a score.

The method envisages evaluating the goodness of attack using three different ways, viz.

Comparison of attacked stream against original watermarked stream,

Comparison of retrieved binary image against original binary image, and

Comparison of retrieved Text against original Text.

The method therefore uses multifactorial approach to unify measure of goodness in 1, 2 and 3 and arriving at a unified set of goodness values.

The method further involves using mean-opinion-score to classify the results of 4 into adjective factors depicting the perceptual quality.

In accordance with a preferred embodiment of the invention, the method involves combining any of the aforesaid steps with one another to arrive at a conclusion for the overall measure of goodness.

The method of this invention can specifically be used for evaluation in the context of a H.264 based compressed domain watermarking scheme.

Further, the method of evaluation using a similar methodology specified above can be used for any video watermarking scheme applied in the context of any compressed or uncompressed video.

BRIEF DESCRIPTION OF THE ACCOMPANYING DRAWINGS

The invention will now be described with reference to the accompanying drawings, in which:

FIG. 1 shows Table 1: List of Attacks;

FIG. 2 shows Table 2: Decision making process based on different parameters;

FIG. 3 shows Table 3: Values in Video Quality Matrix after Attack;

FIG. 4 shows Table 4: Evaluation of Video Quality after Attack;

FIG. 5 shows Table 5: Evaluation of retrieved binary image against original binary image;

FIG. 6 shows Table 6: Evaluation of retrieved Text against original Text; and FIG. 7 shows Table 7: Conclusion of the evaluation

DETAILED DESCRIPTION OF INVENTION

Embedded watermarked message is normally either textual information or binary image. Usually a logo is embedded using image watermarking and information like name, IP address, time stamp etc. are embedded using as text watermarking.

The attack and watermarking technique can be evaluated by how it can remove the watermarked data without hampering the original video data. So the goodness of attack should be characterized by:

Distortion of the video sequence after the attack.

Error in the embedded information retrieved by watermark detector after attack.

Moreover the robustness of the watermarking method also can be judged by comparing original video data and watermarked video data.

Typically, a system and apparatus in accordance with this invention for evaluating the reliability of a watermarking technique for a video sequence comprises:
 a) a calibrating means adapted to calibrate said system and apparatus using a test original video sequence and a test attacked video sequence in compliance with predetermined degrees of quality;
 b) an attacking means adapted to attack embedded watermark in said video sequence, said attack selected from a group of attacks; and
 c) an evaluating means including a comparator means for comparing the test original video sequence with test attacked video sequence and the watermark in the test original video sequence with the watermark in the test attacked video sequence to evaluate the reliability of a watermarking technique to give a reliability score.

The calibrating means comprises:
 a video receiving means adapted to receive a video sequence comprising IDR frames and P frames having macroblocks and sub-macroblocks;
 a frame reading means adapted to read said video sequence frame by frame; and
 a watermark detector adapted to retrieve embedded watermark in said frame of said video sequence.

The video receiving means is adapted to receive said test original video sequence and said test attacked video sequence.

The calibrating means is adapted to:
 compare two identical frames and calibrate said apparatus to treat such identical frames as best case data sets;
 compare two completely different frames and calibrate said apparatus to treat such completely different frames as worst case data sets; and
 compare an original and a compressed-decompressed frame and calibrate said apparatus to treat such compressed-decompressed frames as average case data sets.

The attacking means selects at least one attacking technique from a group of attacking techniques consists of rotational attacking technique, averaging attacking technique, circular averaging technique, frequency filtering attacking technique, gamma correction attacking technique, gausian attacking technique, histogram equalization attacking technique, laplacian attacking technique, non-linear filtering attacking technique, and resize attacking technique.

The evaluation means comprises:
 a first computation means adapted to obtain pixel based metrics for said test attacked video sequence, said pixel based metrics including values computed by at least one function selected from a group of functions for comparing two still frames of said test attacked video sequence;
 a deviation checking means adapted to obtain deviation of binary constituents of images and text embedded as said watermark in said test attacked video sequence;
 a register adapted to receive and store human-based scores; and
 a second computation means adapted to compute a qualitative result of degree of quality of test attacked video sequence based on results from said first computation means, said deviation checking means and said register.

The invention includes a method of using different pixel based metrics (typically, 10 parameters) for finding the video distortion. This method is carried out by the first computation means.

There are other parameters like Maximum Difference, Norm, Average Absolute Difference, L-Norm, Normalized Cross-Correlation, Correlation Quality, Sigma Signal to Noise Ratio, Sigma to Error Ratio etc. which are used as metrics for distortion in Image domain, but it was found that they do not convey much information as far as video quality is concerned.

The first computation means selects at least one computation function selected from a group of computation functions consisting of:

1. Average Absolute Difference (AAD)

$$AAD = \frac{1}{MN} \sum_{m,n} |I_{m,n} - \bar{I}_{m,n}|;$$

2. Mean Square Error (MSE)

$$MSE = \frac{1}{MN} \sum_{m,n} (I_{m,n} - \bar{I}_{m,n})^2;$$

3. Normalized Mean Square Error (NMSE)

$$NMSE = \sum_{m,n} (I_{m,n} - \bar{I}_{m,n})^2 \bigg/ \sum_{m,n} I_{m,n}^2;$$

4. Laplacian Mean Square Error (LMSE)

$$LMSE = \sum_{m,n} (\nabla^2 I_{m,n} - \nabla^2 \bar{I}_{m,n})^2 \bigg/ \sum_{m,n} (\nabla^2 I_{m,n})^2;$$

5. Signal to Noise Ratio (SNR)

$$SNR = \sum_{m,n} I_{m,n}^2 \bigg/ \sum_{m,n} (I_{m,n} - \bar{I}_{m,n})^2;$$

6. Peak Signal to Noise Ratio (PSNR)

$$PSNR = MN \cdot \max_{m,n} I_{m,n}^2 \bigg/ \sum_{m,n} (I_{m,n} - \bar{I}_{m,n})^2;$$

7. Image Fidelity (IF)

$$IF = 1 - \sum_{m,n} (I_{m,n} - \bar{I}_{m,n})^2 \bigg/ \sum_{m,n} I_{m,n}^2;$$

8. Structural Content (SC)

$$SC = \sum_{m,n} I_{m,n}^2 \Big/ \sum_{m,n} \bar{I}_{m,n}^2;$$

9. Global Sigma Signal to Noise Ratio (GSSNR)

$$GSSNR = \sum_{m,n} \sigma_b^2 \Big/ \sum_b (\sigma_b - \bar{\sigma}_b)^2$$

Where $\sigma_b = \sqrt{\frac{1}{P}\sum_{block\ b} I_{m,n}^2 - \left(\frac{1}{P}\sum_{block\ b} I_{m,n}\right)^2}$; and 10. Histogram Similarity (HS)

$$HS = \sum_{c=0}^{255} |f_I(c) - \bar{f}_I(c)|$$

where $f_I(c)$ is the relative frequency of level c in a 255 levels image

The retrieved watermark image/message can be judged to be good or bad by checking some of its features, too.

The method involves using different feature-based scores (3 for image and 2 for text) for checking the retrieved text or image quality.

The deviation checking means computes centroid deviation for black and white pixels of a watermarked image of an attacked video sequence and checks it against original video sequence.

First Check for binary images:

Centroid deviation of 1s and 0s—In most of the cases binary images are used as watermark image. Any binary image consists of only two image values: 0 and 1. Now the Centroid of 0s and 1s means that the center of gravity for each of these pixel values.

The checking algorithm is as follows:

Compute the Centroid of 1s and 0s for the image that has been used as watermark

Compute the same for retrieved image

Now find the deviation for black pixels and white pixels.

For example if we compute the average of the x and y coordinate of each pixels having 0 values, the average positional coordinate will represent the Centroid of pixel value 0 in this particular binary image. Same thing can be done for pixels having value 1.

Now deviation of Centroid is computed by finding the shift in Centroid coordinates in two binary images. Say, for example, the Centroid of 0 valued pixels in image 1 and image 2 be represented as image_$1_0$ and image_$2_0$ respectively. Now the Centroid deviation can be computed as: image_$1_0$-image_$2_0$ The deviation checking means computes run length of black and white pixels of a watermarked image of an attacked video sequence and checks it against original video sequence.

Second Check for binary images:

Run length feature—If image of some text is inserted as the watermark, Runlength of black/white pixels is a feature by which it can be recognized. As we have already explained that a binary image consists of only two pixel values: 0 and 1 representing white and black respectively. Now any image may contain some consecutive pixels in a row having the same color. This consecutive pixels having similar color is known as run of this particular color. As this color can be white or black, accordingly run length feature for each of these colors can be obtained.

The checking algorithm is as follows:

Compute the Runlength of white/black (0/1) for each row of original image

Compute the Runlength of white/black (0/1) for each row of retrieved image

The deviation checking means computes deviation from 0 to 1 and 1 to 0 for each row of a watermarked image of an attacked video sequence and checks it against original video sequence.

The deviation checking means computes deviation from 0 to 1 and 1 to 0 for each column of a watermarked image of an attacked video sequence and checks it against original video sequence.

Third Check for binary images:

Crossing count feature—If image of some text is inserted as the watermark, number of 0 to 1 transition or 1 to 0 transition is an interesting feature. As we have already explained that a binary image consists of only two pixel values: 0 and 1 representing white and black respectively. Now any image may contain some consecutive pixels in a row having the same color or there may be a transition of color (from black to white or white to black). Crossing count feature computes the number of such transitions.

The checking algorithm can be:

Compute the 0 to 1 and 1 to 0 transitions for each row of original image

Compute the 0 to 1 and 1 to 0 transitions for each column of original image

The deviation checking means computes hamming distance between watermarked text of two frames of an attacked video sequence and checks it against original video sequence.

First Check for text message:

Hamming distance between texts—In information theory, the Hamming distance between two strings of equal length is the number of positions for which the corresponding symbols are different. It measures the number of edit required to change one into the other, or the number of errors that transformed one string into the other.

The checking means computes Levenshtein distance between watermarked text of two frames of an attacked video sequence and checks it against original video sequence.

Second Check for text message:

Levenshtein distance—In information theory and computer science, the Levenshtein distance or edit distance between two strings is given by the minimum number of operations needed to transform one string into the other, where an operation is an insertion, deletion, or substitution of a single character. It is named after Vladimir Levenshtein, who considered this distance in 1965. It is useful in applications that need to determine how similar two strings are, such as spell checkers. It can be considered a generalization of the Hamming distance, which is used for strings of the same length and only considers substitution edits. There are also further generalizations of the Levenshtein distance that consider, for example, exchanging two characters as an operation, like in the Damerau-Levenshtein distance algorithm.

The register is adapted to store inputted video sequence degree of evaluation human-based scores (as defined herein) wherein, said original video sequence and said attacked video sequence are visually compared by a plurality of persons and judged on a common scale to provide a score.

The method of this invention can specifically be used for evaluation in the context of a H.264 based compressed domain watermarking scheme.

Further, the method of evaluation using a similar methodology specified above can be used for any video watermarking scheme applied in the context of any compressed or uncompressed video.

Method of Evaluation:

A single point decision from a number of feature values described above can be arrived at. For the analysis all the well-known attacks are considered, the list of which is given in table 1.

There are three different ways of evaluation
1. Evaluation of attacked stream against original watermarked stream
2. Evaluation of retrieved binary image against original binary image
3. Evaluation of retrieved Text against original Text In the following sections we describe each of the evaluation methods in detail and then try to derive a single measure of goodness based on the results of the evaluation through these three methods.

Evaluation of attacked stream against original watermarked stream: In this scheme, each of the frames of the attacked video sequence is evaluated against each of watermarked video sequence. Each frame is judged by using 10 different parameters (AAD, GSSNR, LMSE, MSE, PSNR, HS, IF, NMSE, SC, SNR). But these parameters give some mere values from which it is not easy to conclude anything. Hence there is a need to use the formulation of multifactorial based approach where different parameters are used to make a decision.

The evaluation method of assigning fuzzy value based on multifactorial analysis is given in detail below—
1. Compare identical image files to get these parameter values and treat this data set as best case data.
2. Compare two completely different image files to get the same parameter values and treat this data set as worst case data.
3. Compare the original and a compressed-decompressed bitstream and get the values. We treat this data set as the average case.
4. These three sets of parameters are used as benchmark figures.
5. All parameters are assigned to values between 0 (for worst) to 5 (for best) based on these observed values.
6. From the above these three sets of values it is observed that some parameter values (like AAD, GSSNR, LMSE, MSE, PSNR) vary largely for three types of cases. But other values vary not so abruptly.
7. In this method the formula, VALUE=((AAD+GSSNR+LMSE+MSE+PSNR)*3+HS+IF+NMSE+SC+SNR), is used where the multiple factors are used to assign a single value using multifactorial approach.
8. 20 users (15 men and 5 women) are requested to judge attacked and original watermarked video sequence based on their perception. This judgement is purely based on human vision psychology (HVS). All these opinions are summed up in Mean Opinion Score (MOS).
9. This test is performed on the basis of 14 test streams.
10. A fuzzy value is assigned to the parameter "Cqual" based on VALUE that matches the result obtained from HVS. The method used is like
IF(VALUE>=90), Cqual="Excellent",
IF(VALUE>=80), Cqual="Good",
IF(VALUE>=75), Cqual="Average",
IF(VALUE>=70), Cqual="Bad",
ELSE Cqual="Poor"

Evaluation of retrieved binary image against original binary image: In this scheme each of the frames of the attacked video sequence is evaluated against each of watermarked video sequence. Each frame is judged by using the parameters like bit error, deviation of Centroid and difference in crossing count. The method is given in detail as below:
1. Compute Euclidian distance (d) of Centroid of black pixels of retrieved and original binary image.
2. If the resolution of the embedded binary image is height (h) cross width (w), the deviation parameter ($d_e$) is computed as:

$$d_e = \frac{d}{\sqrt{h^2 + w^2}} * 100$$

3. Bit error ($b_e$) is the number of bits differing between retrieved and original binary image represented in percentage.
4. If c be the difference in crossing count of 0 to 1 of original and retrieved binary image, Crossing count error ($c_e$) is defined as:

$$c_e = \frac{c}{h*w} * 100$$

5. Error in retrieved image is defined as:

$$e = (c_e + b_e + d_e)/3$$

6. The conclusion can be drawn as follows:
If e<0.5 Cimg is Excellent
If e>0.5 Cimg is Good
If e>5 Cimg is Medium
If e>10 Cimg is Bad
If e>15 Cimg is Poor
7. This rating is based on the MOS already defined.

Evaluation of retrieved Text against original Text:
For evaluating the goodness of retrieved text message against the original message, w two distance parameters are considered: hamming distance (h) and Levensthein distance (l).
The mean error ($t_e$) is computed as:

$$t_e = \frac{l+h}{2}$$

The conclusion can be drawn as follows.
If $t_e$<0.5 $C_{txt}$ is Excellent
If $t_e$>0.5 $C_{txt}$ is Good
If $t_e$>1 $C_{txt}$ is Medium
If $t_e$>3 $C_{txt}$ is Bad
If $t_e$>5 $C_{txt}$ is Poor Aggregation of the above three methods for single point decision making: In descriptive terms, the aggregation can be performed using the concept that if there is no significant degradation in video quality and the retrieved watermarked information does not contain significant errors, then the watermarking scheme has a high measure of goodness. The aggregation methodology is summarized in Table 2 of the accompanying drawings.

The results obtained by applying some attacks of Stirmark on the watermarking scheme. In Table 3 the values of different image quality indicating parameters to compute the VALUE. In table 4 the adjective factors are populated from VALUE. Similarly Table 5 and Table 6 show the conclusion on retrieved binary image against original binary image and the conclusion on retrieved text message is drawn respectively. Table 7 shows the conclusion about the goodness of the watermarking method and the attack technique.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

The invention claimed is:

1. A system and apparatus for evaluating the reliability of a watermarking technique for a video sequence, said system and apparatus comprising:
    a) a calibrating means adapted to calibrate said system and apparatus using a test original video sequence and a test attacked video sequence in compliance with predetermined degrees of quality;
    b) an attacking means adapted to attack embedded watermark in said video sequence, said attack selected from a group of attacks; and
    c) an evaluating means including a comparator means for comparing the test original video sequence with test attacked video sequence and the watermark in the test attacked video sequence to evaluate the reliability of a watermarking technique to give a reliability score wherein said calibrating means is adapted to: compare two identical frames and calibrate said apparatus to treat such identical frames as best case data sets: compare two completely different frames and calibrate said apparatus to treat such completely different frames as worst case data sets; and compare and a compressed-decompressed frame and calibrate said apparatus to treat such compressed-decompressed frames as average case data sets.

2. A system and apparatus as claimed in claim 1, wherein said calibrating means comprises:
    a video receiving means adapted to receive a video sequence comprising IDR frames and P frames having macroblocks and sub-macroblocks;
    a frame reading means adapted to read said video sequence frame by frame; and
    a watermark detector adapted to retrieve embedded watermark in said frame of said video sequence.

3. A system and apparatus as claimed in claim 2 wherein said video receiving means is adapted to receive said test original video sequence and said test attacked video sequence.

4. A system and apparatus as claimed in claim 1 wherein, said attacking means selects at least one attacking technique from a group of attacking techniques consists of rotational attacking techniques, average attacking technique, circular averaging technique, frequency filtering attacking technique, gamma correction attacking technique, gausian attacking technique, histogram equalization attacking technique, laplacian attacking technique, non-linear filtering attacking technique, and resize attacking technique.

5. A system and apparatus as claimed in claim 1, wherein said evaluation means comprises:
    a first computation means adapted to obtain pixel based metrics for said test attacked video sequence, said pixel based metrics including values computed by at least one function selected from a group of functions for comparing two still frames of said test attacked video sequence;
    a deviation checking means adapted to obtain deviation of binary constituents of images and text embedded as said watermark in said test attacked video sequence;
    a register adapted to receive and store human-based scores; and
    a second computation means adapted to compute a qualitative result of degree of quality of test attacked video sequence based on results from said first computation means, said deviation checking means and said register.

6. A video evaluation apparatus as claimed in claim 5 wherein, said first computation means selects at least one computation function selected from a group of computation functions consisting of:

1. Average Absolute Difference (AAD)

$$AAD = \frac{1}{MN} \sum_{m,n} |I_{m,n} - \bar{I}_{m,n}|;$$

2. Mean Square Error (MSE)

$$MSE = \frac{1}{MN} \sum_{m,n} (I_{m,n} - \bar{I}_{m,n})^2;$$

3. Normalized Mean Square Error (NMSE)

$$NMSE = \sum_{m,n} (I_{m,n} - \bar{I}_{m,n})^2 \bigg/ \sum_{m,n} I_{m,n}^2;$$

4. Laplacian Mean Square Error (LMSE)

$$LMSE = \sum_{m,n} (\nabla^2 I_{m,n} - \nabla^2 \bar{I}_{m,n})^2 \bigg/ \sum_{m,n} (\nabla^2 I_{m,n})^2;$$

5. Signal to Noise Ratio (SNR)

$$SNR = \sum_{m,n} I_{m,n}^2 \bigg/ \sum_{m,n} (I_{m,n} - \bar{I}_{m,n})^2;$$

6. Peak Signal to Noise Ratio (PSNR)

$$PSNR = MN \cdot \max_{m,n} I_{m,n}^2 \bigg/ \sum_{m,n} (I_{m,n} - \bar{I}_{m,n})^2;$$

7. Image Fidelity (IF)

$$IF = 1 - \sum_{m,n} (I_{m,n} - \bar{I}_{m,n})^2 \bigg/ \sum_{m,n} I_{m,n}^2;$$

8. Structural Content (SC)

$$SC = \sum_{m,n} I_{m,n}^2 \Big/ \sum_{m,n} \bar{I}_{m,n}^2;$$

9. Global Sigma Signal to Noise Ratio (GSSNR)

$$GSSNR = \sum_{m,n} \sigma_b^2 \Big/ \sum_b (\sigma_b - \overline{\sigma}_b)^2$$

Where $\sigma_b = \sqrt{\frac{1}{p}\sum_{block\ b} I_{m,n}^2 - \left(\frac{1}{p}\sum_{block\ b} I_{m,n}\right)^2}$ ; and 10. Histogram Similarity (HS)

$$HS = \sum_{c=0}^{255} |f_I(c) - \bar{f}_I(c)|$$

where $f_1(c)$ is the relative frequency of level c in a 255 levels image.

7. A video evaluation apparatus as claimed in claim 5 wherein, said deviation checking means computes centroid deviation for black and white pixels of a watermarked image of an attacked video sequence and checks it against original video sequence.

8. A video evaluation apparatus as claimed in claim 5 wherein, said deviation checking means computes run length of black and white pixels of a watermarked image of an attacked video sequence and checks it against original video sequence.

9. A video evaluation apparatus as claimed in claim 5 wherein, said deviation checking means computes deviation from 0 to 1 and 1 to 0 for each row of a watermarked image of an attacked video sequence and checks it against original video sequence.

10. A video evaluation apparatus as claimed in claim 5 wherein, said deviation checking means computes deviation from 0 to 1 and 1 to 0 for each column of a watermarked image of an attacked video sequence and checks it against original video sequence.

11. A video evaluation apparatus as claimed in claim 5 wherein, said deviation checking means computes hamming distance between watermarked text of two frames of an attacked video sequence and checks it against original video sequence.

12. A video evaluation apparatus as claimed in claim 5 wherein, said deviation checking means computes Levenshtein distance between watermarked text of two frames of an attacked video sequence and checks it against original video sequence.

13. A video evaluation apparatus as claimed in claim 5 wherein, said register is adapted to store inputted video sequence degree of evaluation human-based scores wherein, said original video sequence and said attacked video sequence are visually compared by a plurality of persons and judged on a common scale to provide a score.

* * * * *